July 10, 1934.  J. M. YOUNG  1,965,624
METHOD OF FREEZING FOOD PRODUCTS
Filed Oct. 16, 1929
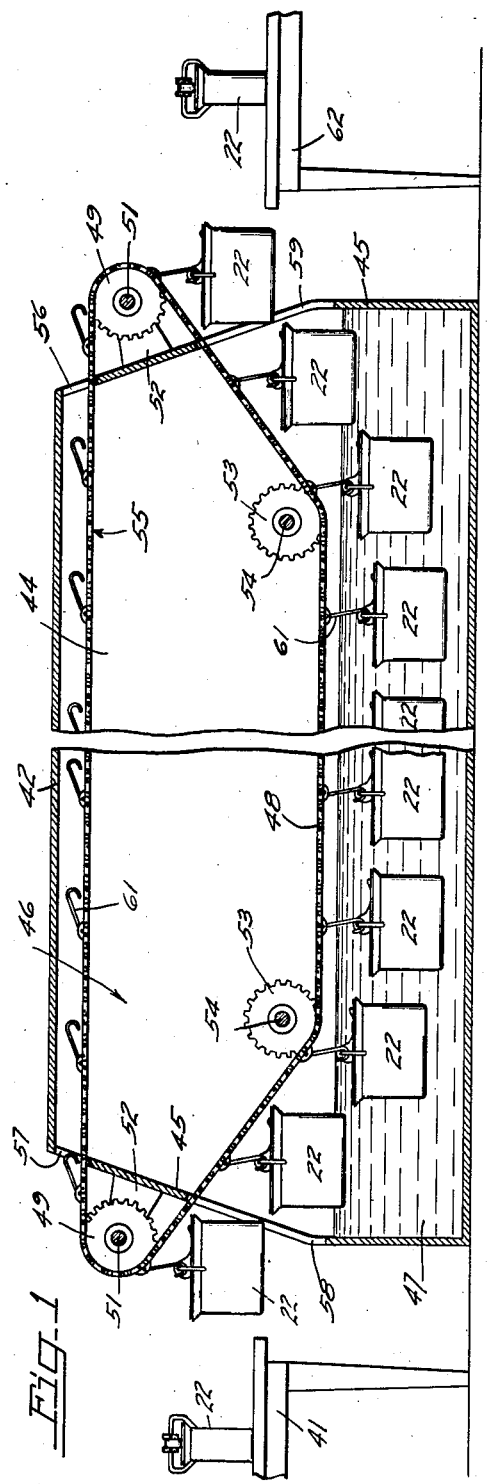
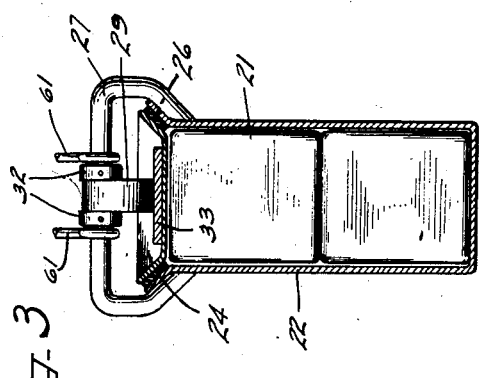
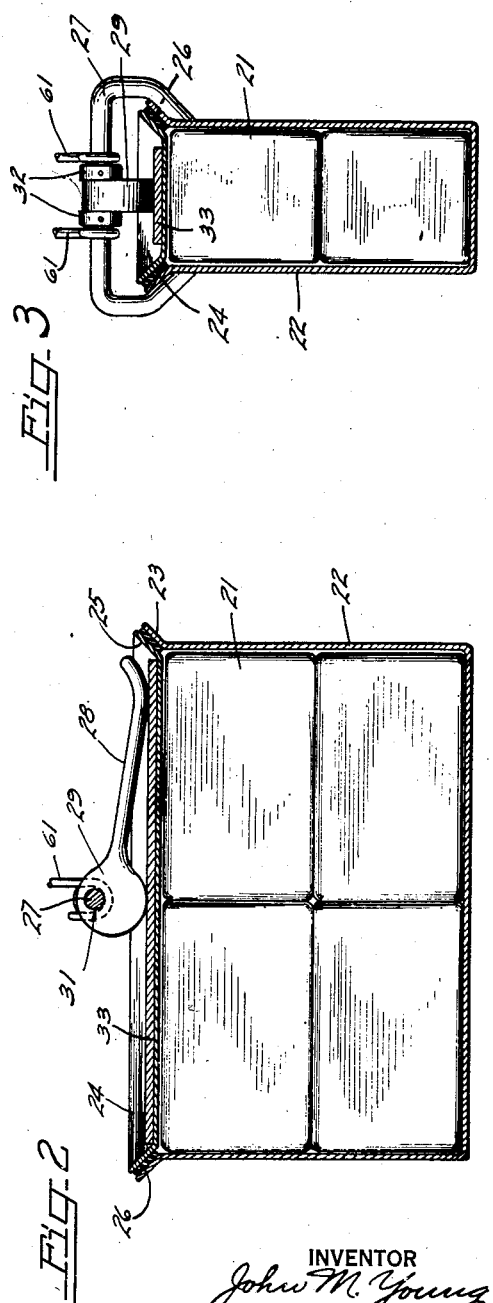
INVENTOR
John M. Young
BY John C. Carpenter
ATTORNEY Patented July 10, 1934

1,965,624

UNITED STATES PATENT OFFICE 1,965,624

METHOD OF FREEZING FOOD PRODUCTS

John M. Young, Brooklyn, N. Y., assignor to American Can Company, New York, N. Y., a corporation of New Jersey Application October 16, 1929, Serial No. 400,110

2 Claims. (Cl. 62—170)

The present invention relates to a method of freezing food products and has particular reference to the freezing of products which have been packed in fibre containers.

One method of distributing perishable food products, such as small fruits, berries and vegetables, is at the present time being used with great success, and this method embraces the reduction in temperature of the food product sufficiently to freeze it after which a temperature below freezing is maintained during shipment of the same to certain distributing points and to the ultimate consumer. A favorite type of container for holding the food product, treated according to such a method, is a container made of fibre which may be either in folded box form or may be formed as a tubular body with slip cover ends. Such a fibre package being more or less porous must be frozen, according to present day methods, in a refrigerating room where low temperatures and a circulation of cold air is utilized to extract the heat from the filled package. Since air or at least a gaseous medium is used, this must of necessity require some length of time and it is to improve the method of freezing such a package and reduce the time of freezing that the present invention is primarily directed.

The principal object of the present invention is the provision of a method in which the ordinary fibre container filled with food product is immersed beneath the surface of a liquid refrigerant and thereby frozen. In carrying out the steps of this improved method the food product in the fibre containers is placed in a metallic containing vessel which is temporarily sealed to prevent absorption of any liquid by the walls of the fibre containers as the sealed vessel is brought in direct contact with the chilling liquid of the refrigerant during its immersion. The principle of heat conduction is thus made use of and the metallic walls of the vessel rapidly disperse the extracted heat into the refrigerating liquid.

Numerous other objects and advantages of the invention will be apparent as it is better understood from the following description, which, taken in connection with the accompanying drawing, discloses a preferred embodiment thereof.

A schematic showing of the principal parts of an apparatus capable of carrying out the present invention is disclosed in the drawing, this being merely a preferred form for illustrating the various steps in this improved operation of freezing.

Referring to the drawing:—

Figure 1 is a longitudinal sectional view partially in elevation of such an apparatus.

Fig. 2 is a longitudinal sectional view through a metallic vessel used in conveying filled containers through the refrigerating operation, the view also illustrating a metallic cover clamped in sealed position after the filled fibre containers have been placed therein.

Fig. 3 is a transverse sectional view of the vessel and its contents.

In carrying out the steps of the present invention, the food products to be frozen are prepared in the ordinary manner and packaged in a fibre container 21 (Figs. 2 and 3). This fibre container may be circular in form or may be rectangular, the latter form being illustrated, this particular form being relatively flat to more readily permit the heat extraction.

The first step in the practice of the invention comprises placing one or more of the filled fibre containers 21 in a vessel 22 which is preferably of such shape as to hold several containers in stacked formation but in width only sufficient to accommodate one single narrow width. Such a vessel is preferably made of metal or of some rapid heat conducting material and is provided with a flange 23 at its top which extends upwardly and outwardly at an angle to the wall of the vessel.

After the fibre containers 21 have been placed in the vessel 22, a cover 24, preferably formed of metal or of the same material as the vessel and having an upwardly and outwardly extending flange 25, is positioned on the vessel to close its top open end. An annular gasket 26 may be interposed between the flanges 23 and 25 to provide a hermetic seal at their connections.

The vessel 22 is provided with a looped bail 27 on which a closing clamp 28 is loosely positioned. The clamp 28 is provided with a circular head 29 and the bail 27 passes through an opening 31 eccentrically formed in the head and is loosely held in position on the bail by collars 32.

To tightly close the cover 24 on the vessel 22, the clamp 28 is rotated on the bail 27 and this action forces its head 29 against a plate 33 placed on top of the cover 24 and clamps the cover tightly against the gasket 26 and the flange of the vessel 22 hermetically sealing the vessel.

As illustrated in Fig. 1, this filling and closing of the vessel 22 may conveniently take place at the filling table 41 positioned adjacent one end of a housing 42 which has a floor or bottom wall 43, side walls 44 and end walls 45 enclosing a refrigerating chamber 46.

A liquid refrigerant 47, which may be a brine or any suitable refrigerating liquid is preferably maintained at a low temperature and is contained within the lower part of the chamber 46. An endless chain conveyor 48 is provided and this operates throughout its greater extent within the refrigerating chamber 46.

The conveyor 48 may move over supporting sprockets 49 located exteriorly of the chamber 46 these sprockets being carried on shafts 51 supported in brackets 52 projected from each end wall 45. The conveyor also operates over sprockets 53 mounted on shafts 54 located inside of the chamber 46. The positions of the various sprockets relative to the chamber insure a horizontal return run 55 of the chain 48 which moves from one of the sprockets 49 through an opening 56 formed in the forward end wall 45, through the chamber 46, out through an opening 57 formed in the rear end wall of the chamber thence over the other sprocket 49.

The conveyor chain 48 then moves downwardly at an angle and passes through an opening 58 formed in the rear wall 45 of the chamber, over the rear sprocket 53, along a horizontal path to the forward sprocket 53, thence upwardly at an angle through an opening 59 formed in the front wall 45 of the chamber and over the sprocket 49. This construction insures that the conveyor chain moves through the refrigerating chamber 46 throughout most of its travel.

The conveyor chain 48 is provided with a series of pairs of spaced hooks 61 pivoted therein and these hooks are adapted to lay flat when carried along the moving upper run 55 of the conveyor. As each pair of hooks move over the rear sprocket 49, they drop into a hanging position, as illustrated in Fig. 1.

These hanging hooks 61 move downwardly adjacent the table 41 and in convenient position to an operator stationed at the table and this operator places one of the filled and sealed vessels 22 onto the conveyor 48 by hanging the bail 27 of the vessel on a pair of spaced hooks (see Fig. 3). The weight of the loaded vessel 22, as illustrated in Fig. 1, holds it in substantially horizontal position during the conveyance of the same downwardly and into the liquid refrigerant 47. With the chain 48 thus continuing its travel the vessels 22 hanging thereon are immersed beneath the liquid refrigerant and are further conveyed therethrough as they move from one sprocket 53 to the other.

Upon the upward run of the conveyor at the forward or exit end of the chamber, the vessels 22 carried thereby are conveyed upwardly and out of the chamber 46 to a position adjacent a discharge table 62 located in front of the front wall 45 of the chamber. At this position the operator unhooks each vessel 22 from the conveyor 48 and removes it to the table 62 from whence it may be conveyed to any suitable place of storage or to another apparatus for subsequent treatment.

During the passing of the sealed vessel 22 through the liquid refrigerant 47, the heat of the vessel and the heat of the enclosed containers 21 with their contents, is extracted and the food product is thereby frozen. By reason of the comparatively narrow vessel 22, both side walls are sufficiently close to the interior of the containers 21 to rapidly and efficiently extract the heat from the enclosed product, the sealed vessels 22 preventing any contact between the liquid refrigerant and the walls of the filled containers.

It is thought that the invention and many of its attendant advantages will be understood from the foregoing description, and it will be apparent that various changes may be made in the form, construction, and arrangement of the devices mentioned herein and in the steps and their order of accomplishment of the process described herein, without departing from the spirit and scope of the invention or sacrificing all of its material advantages, the forms and processes hereinbefore described being merely a preferred embodiment thereof.

I claim:

1. The method of freezing food products in fibre containers which comprises, inserting the filled fibre container into a metallic vessel which is a good conductor of heat and is of narrow dimension, the fibre container being a poor conductor of heat and fitting said narrow dimension, and hermetically sealing the said vessel by clamping a metallic cover thereon, passing the sealed vessel into and through a liquid refrigerant contained in a refrigerating chamber by placing it onto a continuously moving conveyor, and thence removing the said vessel with its frozen contents from the said conveyor after it has passed through the said chamber.

2. The method of freezing food products, which consists in packing a food product within a container which is a poor conductor of heat, enclosing and sealing said container and product within an outer vessel which is a good conductor of heat, and then subjecting said outer vessel and sealed contents to a freezing temperature by immersing the same in a liquid refrigerant and thereby rapidly extracting the heat of said product outward into said container and thence into said outer vessel and thence into said liquid refrigerant, until said product is frozen, after which treatment said container will retard the reabsorption of heat into said product.

JOHN M. YOUNG.